United States Patent [19]
Foldenauer et al.

[11] 3,796,144
[45] Mar. 12, 1974

[54] APPARATUS FOR COOKING AND CHILLING MEAT IN MOLDS

[75] Inventors: Ralph M. Foldenauer, c/o Foldenauer Equipment Co., 7848 W. 80th St., Bridgeview, Ill. 60455; William H. Neubeck, Jr., Chicago, Ill.

[73] Assignee: said Foldenauer, by said Neubeck

[22] Filed: May 17, 1972

[21] Appl. No.: 253,975

[52] U.S. Cl. ........................ 99/355, 99/384, 99/441
[51] Int. Cl. ............................................. A47j 27/20
[58] Field of Search ............. 99/355, 352, 353, 384, 99/416, 417, 426, 428, 441, 470, 427; 126/369

[56] References Cited
UNITED STATES PATENTS

| | | | |
|---|---|---|---|
| 374,909 | 12/1887 | Hopper | 99/416 UX |
| 2,805,788 | 9/1957 | Allbright et al. | 99/349 UX |
| 3,316,829 | 5/1967 | Foldenauer | 99/355 |
| 3,421,434 | 1/1969 | Krachmer | 99/352 |
| 3,500,743 | 3/1970 | Cameron | 99/441 UX |

Primary Examiner—Peter Feldman
Assistant Examiner—Arthur O. Henderson
Attorney, Agent, or Firm—Olson, Trexler, Wolters & Bushnell

[57] ABSTRACT

A transportable apparatus for cooking and chilling food products such as meat in molds comprises a housing with a series of plastic bars therein. The plastic bars suspend the molds at the laterally outwardly projecting flanges normally present at the upper ends of the molds. Troughs are secured to and depend from the bars and are provided with a series of holes opening toward the mold bodies for discharging a liquid coolant therefrom onto the sides of the mold bodies below the flanges so that the coolant flows downwardly over the mold bodies in a spreading film to chill the molds in an efficient manner. The ends and top of the housing are permanently closed but the sides of the housing have removable side closures that are in place during the steam-cooking operation but may be removed during the chilling process.

10 Claims, 18 Drawing Figures

APPARATUS FOR COOKING AND CHILLING MEAT IN MOLDS

BACKGROUND OF THE INVENTION

This invention relates to improvements in apparatus for cooking and chilling food products, more particularly products that are cooked and chilled in molds.

The apparatus of the present invention is a portable cooking truck in which the molds are heated during a cooking cycle, after which the molds are chilled with water or the like during a chilling cycle. The truck of this invention is for the same general purpose as the truck in Foldenauer U.S. Pat. No. 3,316,829; however the truck of the present invention represents a considerable departure from and a vast improvement over the truck of the aforesaid patent.

The principle purpose of the invention, and of the truck of the aforesaid patent as well, is to cook and chill meat products in molds of a type having a tubular body and a laterally outwardly projecting flange at the upper end of the body and to which a spring-biased mold cover is attached. Molds of this type are in extensive use and it is, therefore, important that any cooking truck be of such design as to be compatible with this type of mold.

A principal problem arising from the mold truck of the aforesaid patent when used with molds of the foregoing type lies in the fact that the cooling or chilling of the molds is relatively inefficient. The mold truck of that patent utilizes a telescoping hood, and the cooling water is discharged from the top of the hood onto the molds. When a number of the molds are loaded onto the truck the top flanges of the respective molds tend to form a shield that prevents the cooling water from impinging upon the sides of the mold. This inhibits an efficient heat transfer from the molds. Moreover, it frequently happens that the upper flange of one mold tends to overlap or abut the upper flange of an adjacent mold so that if the truck is fully loaded, there is frequently formed an almost continuous barrier of flanges at the tops of the molds, all of which restrict the flow of coolant onto the sides of the molds.

Another problem with spraying the cooling water from above the tops of the molds lies in the fact that some of the coolant sprayed from above the molds tends to fall onto the covers and thus into the upper ends of the molds. While the pressure plates of the mold covers form something of a seal, such seal is not perfect with the result that some coolant may tend to seep past the cover and contaminate the product. Therefore, in such circumstances a clean coolant must be used. This generally precludes the use of recirculated, untreated water or brine.

OBJECTS AND SUMMARY OF THE INVENTION

An object of the present invention is to provide an apparatus of the general type and for the general purpose stated in which cooling fluid, such as cooling water, is directed onto the sides of the molds below the top flanges. The cooling liquid runs down the sides of the molds by gravity, and in doing so tends to wrap around each mold, insuring a maximum of heat transfer therefrom. The force of gravity tends to pull the cooling fluid donwardly in a film spreading over each mold, and the film moves at a sufficient velocity to insure a relatively high rate of heat transfer. The coolant may be discharged from the trunk through a bottom drain opening. The coolant may be recirculated or not, as desired.

A further object of the present invention is to provide apparatus of the type stated which prevents coolant from entering the tops of the molds. This prevents contamination of the product in the mold. Moreover, in view of the manner in which the coolant is discharged against the sides of the molds, the cleanliness of the coolant is of no particular consequence.

A further object of the present invention is to provide apparatus of the type stated in which the molds may be quickly and easily loaded into and unloaded from the truck, thereby to facilitate mold-handling procedures.

In accordance with the foregoing object the improved apparatus or truck comprises a housing that is closed at its opposite ends and top but is open at two opposite sides. These sides may, however, be readily closed prior to steam cooking by removable slide closure of novel construction. Suspended within the housing are transverse slider bars of nylon or other suitable material for supporting the molds at their upper marginal flanges. The bars are spaced apart to provide passageways for receiving the molds such that a row of molds will be suspended from a pair of spaced apart bars. Also suspended from the bars are troughs or other suitable conduits. These troughs each have a series of holes opening toward the mold bodies for discharging coolant therefrom onto the mold bodies below the upper flanges of the mold bodies, whereby the coolant flows downwardly by gravity along nearly the full length of each mold body. For supplying coolant to the troughs there is provided a manifold that feeds a distribution trough that extends transversly of the first-mentioned troughs, the distributing trough having nozzles depending therefrom for feeding the coolant to the respective troughs from which the coolant is discharged onto the mold bodies. Coolant may drain through holes in the bottom of the truck and may be recirculated, if desired.

The truck also has a permanent top, eliminating the telescoping top used in the aforementioned patent. Steam is distributed into the truck from a pipe running along the bottom thereof.

DETAILED DESCRIPTION

Figure 1:
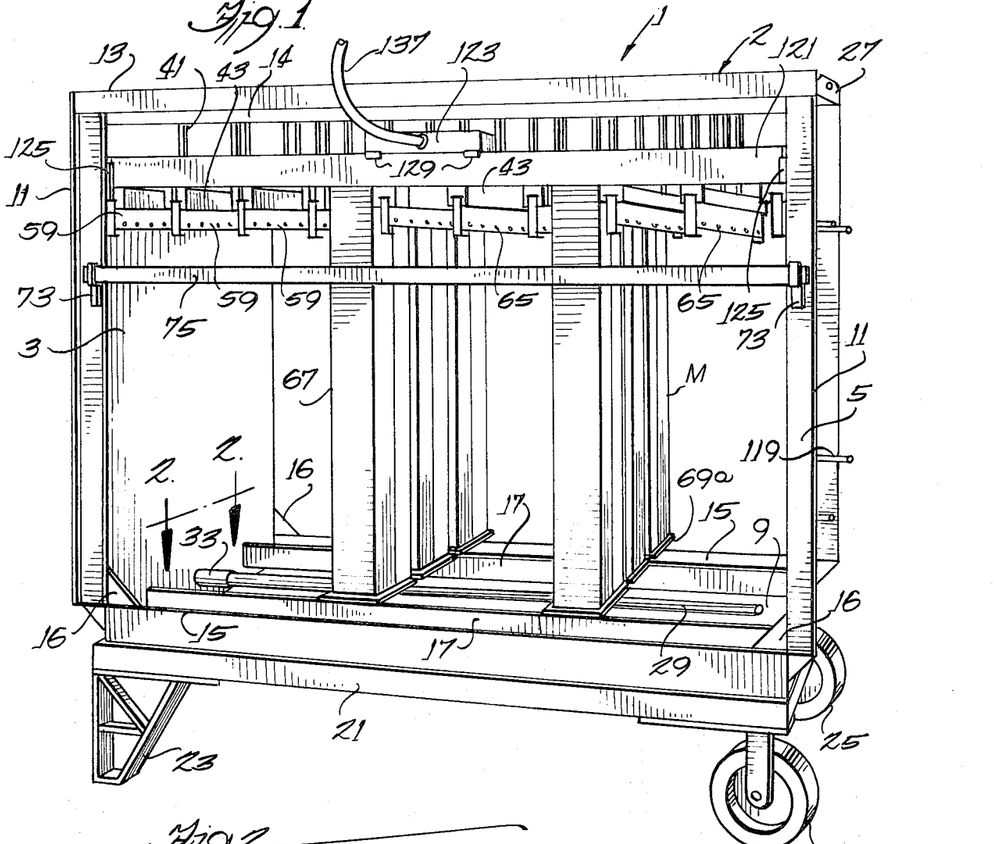
FIG. 1 is a perspective view of a cooking and chilling truck constructed in accordance with and embodying the present invention, the sides of the truck having been removed.
Figures 2, 3:
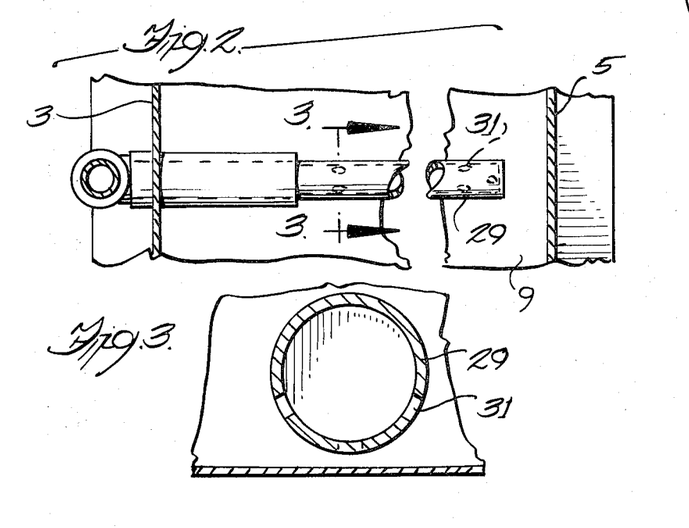
FIG. 2 is a fragmentary sectional view on an enlarged scale taken along line 2—2 of FIG. 1.
FIG. 3 is a fragmentary sectional view on a further enlarged scale taken along line 3—3 of FIG. 2.
Figure 4:
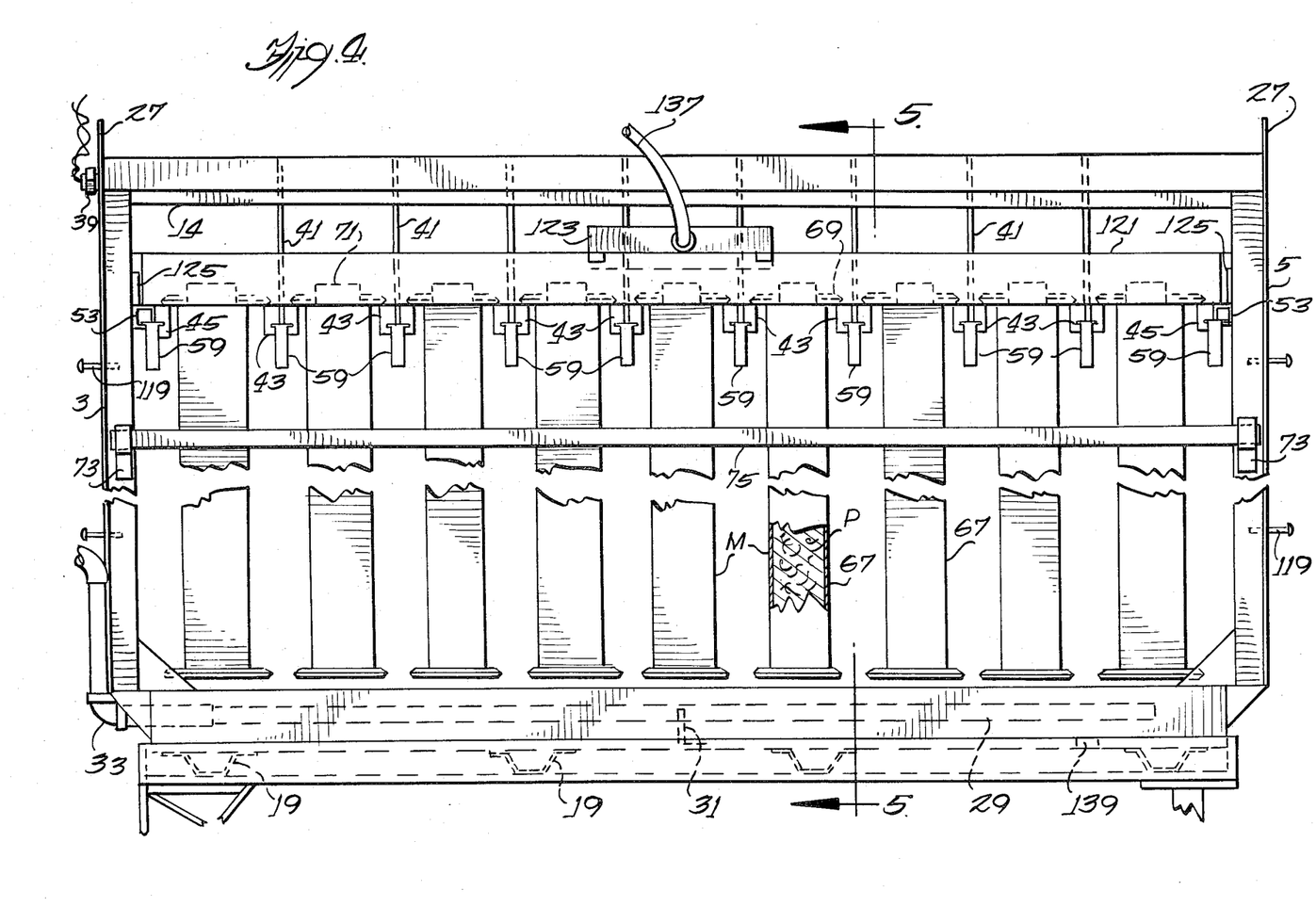
FIG. 4 is a side fragmentary elevational view, partially in section, of the truck of FIG. 1.
Figure 5:
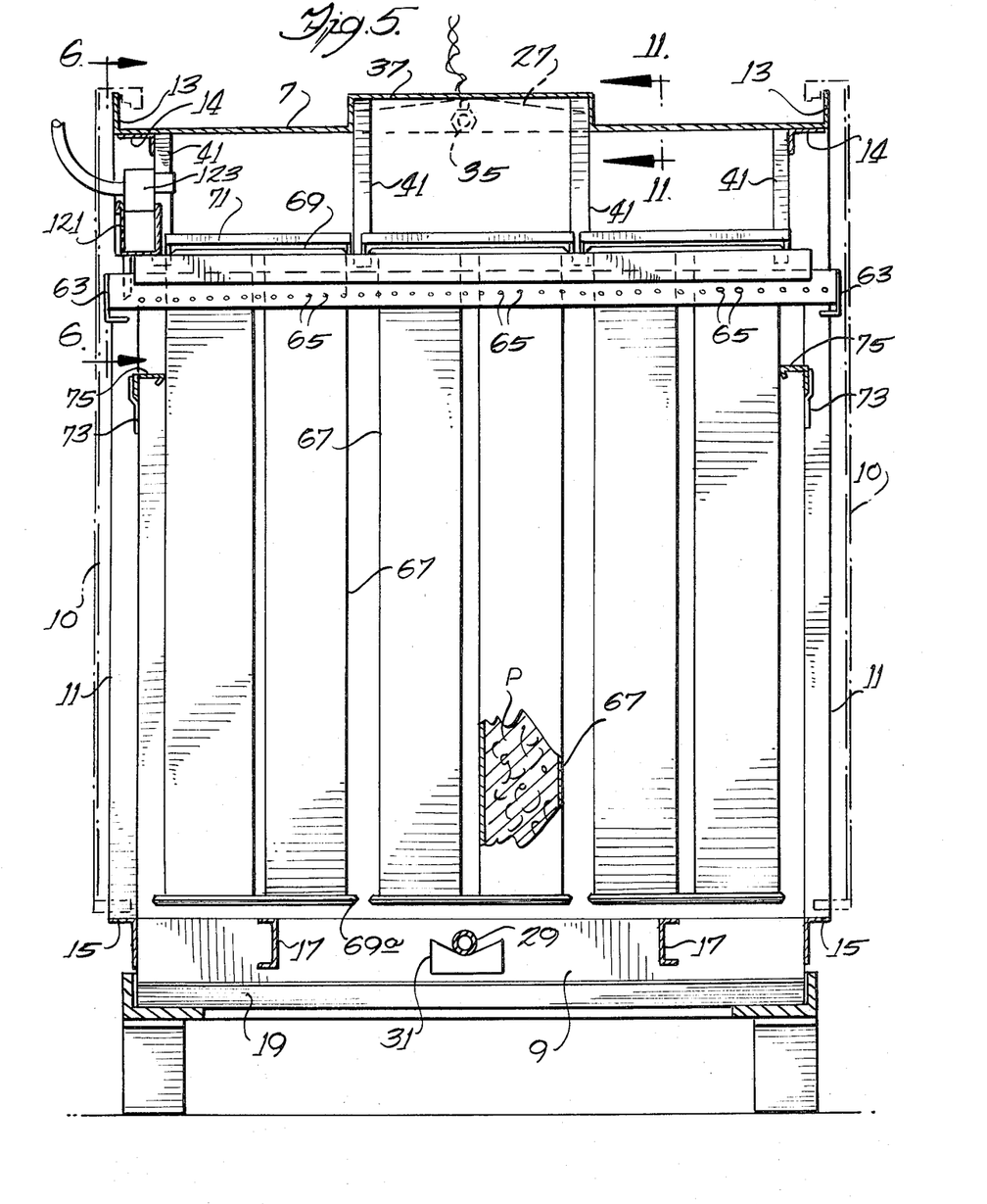
FIG. 5 is a sectional view taken along line 5—5 of FIG. 4, the side closures being shown in phantom.

Referring now in more detail to the drawing, which illustrates a preferred embodiment of the present invention, 1 designates a cooking truck having a frame or housing 2, of generally rectilinear configuration. The housing includes ends 3, 5, a top 7, and a bottom or pan 9, all of which provide wall portions of the housing. As best seen in FIGS. 1, 4 and 5, the housing 2 is open at its sidees but may be closed by removable side closures 10, 10. These side closures 10, 10 are shown in phantom in FIG. 5 and in full lines in FIGS. 13–18. The details of the side closures 10, 10 and their structural relationship with the housing 2 will be more fully described hereafter.

Figure 8:
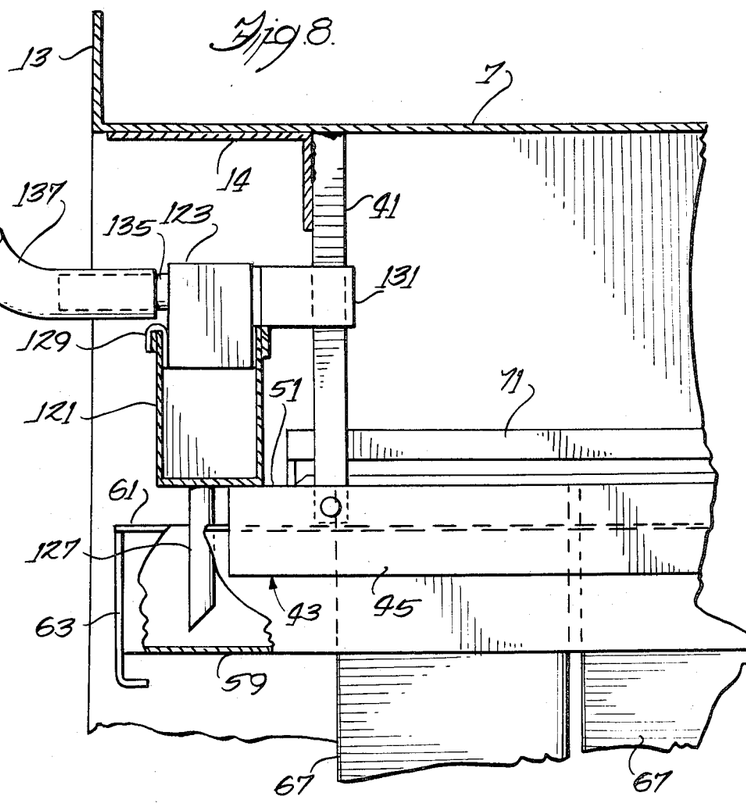

The ends 3, 5 are formed with laterally presented, vertical marginal flanges 11, 11 at each of the open sides of the housing 2, and the top 7 has vertical flanges 13, 13 at those open sides as best seen in FIG. 5. Mounted at the lateral margins of the top 7, namely those margins at the open sides of the housing, are angle members 14, 14, as best seen in FIGS. 4, 5 and 8. In addition, the lateral lips of the pan 9 at the open sides of the housing 2 provide lower horizontal flanges 15, 15. Gusset plates 16 may be welded at the lower corners of the housing.

Extending between the ends 3, 5 and welded to each are spaced parallel channels 17, which are located in the pan 9 above the bottom thereof. The bottom of the pan 9 is provided, on the under side thereof, with parallel, transversely extending stiffeners 19, whereby to rigidify the pan structure and to support the weight of the truck. As seen in FIGS. 1, 4 and 5, the truck 1 may be supported by a suitable skid 21 having a rectilinear frame of known construction. The skid 21 may have feet 23 at one end and wheels 25 at the other end; however, feet or wheels may be provided at either end, as desired. Gnerally speaking, when the truck 1 is supported on the skid 21, the stiffeners 19 are seated on the rectilinear frame of the skid. Secured to the opposite ends of the top 7 are upwardly extending, apertured lift plates 27, 27 at which the truck 1 may be attached to a suitable hoisting mechanism so that the entire truck may be lifted from the skid 21 or lowered onto a skid, as desired.

A steam pipe 20 extends lengthwise of the housing 2 and within the pan 9. The steam pipe 29 has a series of holes 31 along the length thereof and through which the steam issues for heating the interior of the housing 2. The steam pipe 29 rests on a pipe support 31 that is between the ends 3, 5. At the housing end 3 the steam pipe 29 is fitted into a sleeve 33 which projects through the end 3 and extends upwardly for connection to a steam supply line in a known manner.

Figures 11, 12:
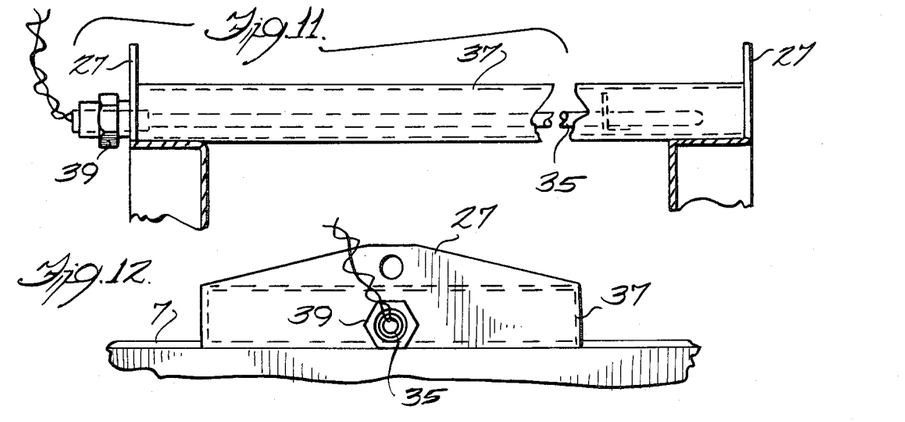
FIG. 11 is a fragmentary sectional view taken along line 11—11 of FIG. 5.
FIG. 12 is a fragmentary front elevational view of the top portion of the left hand side of FIG. 4.
Figure 13:
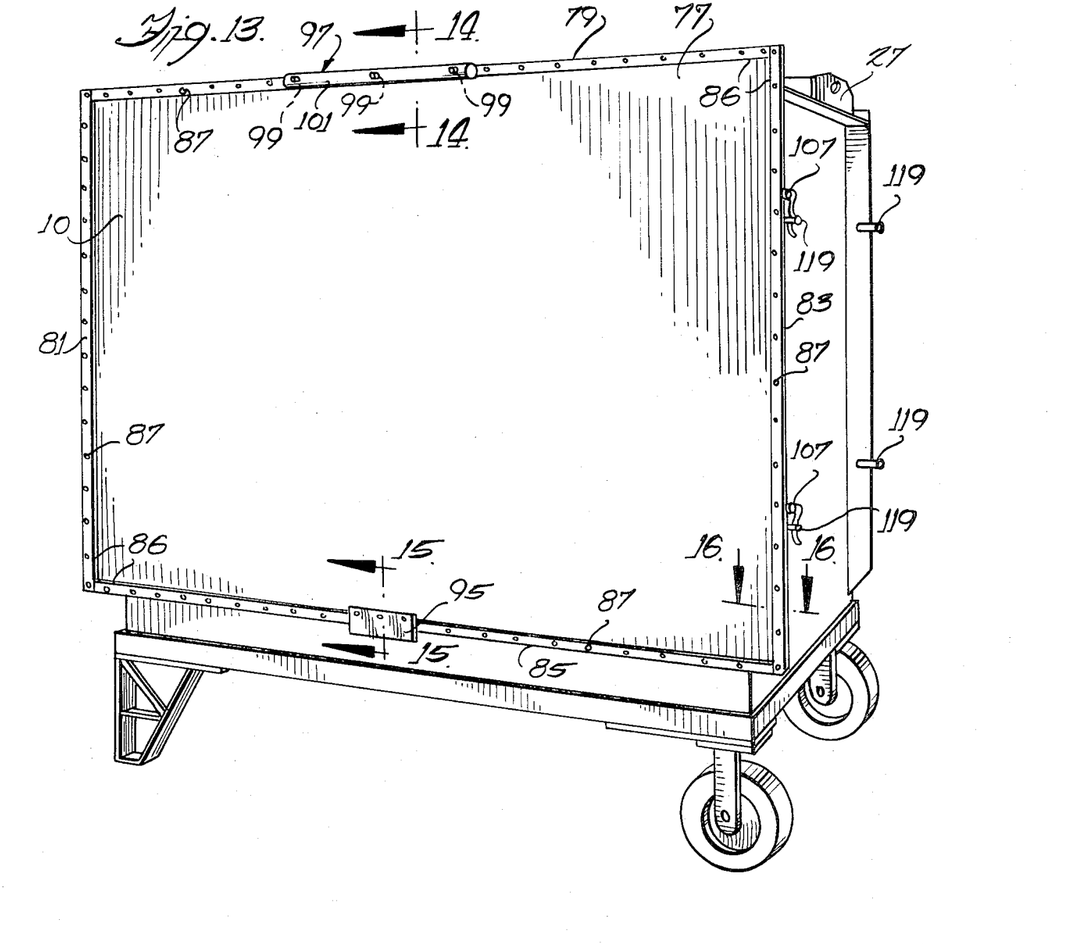
FIG. 13 is a perspective view somewhat similar to FIG. 1 but showing the side closures in place.

The temperature within the housing 2 may be regulated or controlled by a sensing bulb 35 (FIG. 11) that underlies a lengthwise running central raised portion or dome 37 in the top 7. The bulb 37 is secured in place by a union 39 in one of the lift plates 27, and the wires of the sensing bulb 35 are connected to the steam control system in a manner known in the art.

Figures 9, 10:
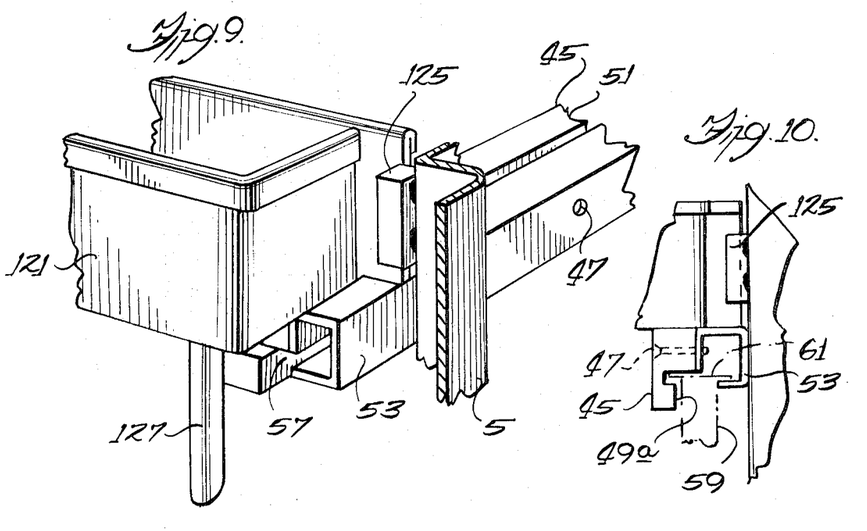
FIG. 9 is a fragmentary corner perspective view, partially broken away, of a portion of the truck.
FIG. 10 is a front elevational view, on a reduced scale, of the structure of FIG. 9.

Suitably secured to and depending from the top 7 are hanger bars 41. These hanger bars may be welded to angles 14 and at the dome 37. At their lower ends the hanger bars 41 support a series of transverse slider bars of nylon or other suitable strong but low friction plastic material. As best seen in detail in FIGS. 6 and 7, each of the slider bars 43 is composed of two similar sections 45, 45 which are secured as by screws 47 to the opposite sides of the hanger bars 41. Thus, the two sections 45, 45 provide a generally T-shaped slot 49 (FIG. 6) and upper slide-bearing surfaces 51, 51, all for purposes presently more fully appearing. As best seen in FIGS. 4, 9 and 10, the arrangement at the opposite ends of the housing uses a single bearing section 45 in conjunction with a generally rectilinear hanger clip 53 which is secured to the side 3 or the side 5, as the case may be. The hanger clip 53 has a corner slot 57 which cooperates with the adjacent slider bar section 45 to provide a slot 49a (FIG. 10), which serves the same purpose as that of the slot 49.

Mounted within the slots 49, 49a are conduits or troughs 59 having upper lateral flanges 61 (FIGS. 6, 8 and 10) which rest upon the slider bar sections 45, 45 whereby the troughs 59 are suspended therefrom. The end-most troughs are, of course, suspended from the slider bar section 45 and the adjacent hanger clip 53. The troughs 59 extend downwardly below the slider bars 43 and are, furthermore, somewhat longer than the slider bars 43 and hanger clips 53 so as to project beyond the ends of each, as shown for instance, in FIGS. 5, 7 and 8. The troughs 59 open upwardly and are closed off at their opposite ends by plates 63. The opposite sides of the troughs 59 are perforated to provide a series of spaced apart holes 65 that run almost the full length of each trough 59.

Figure 6:
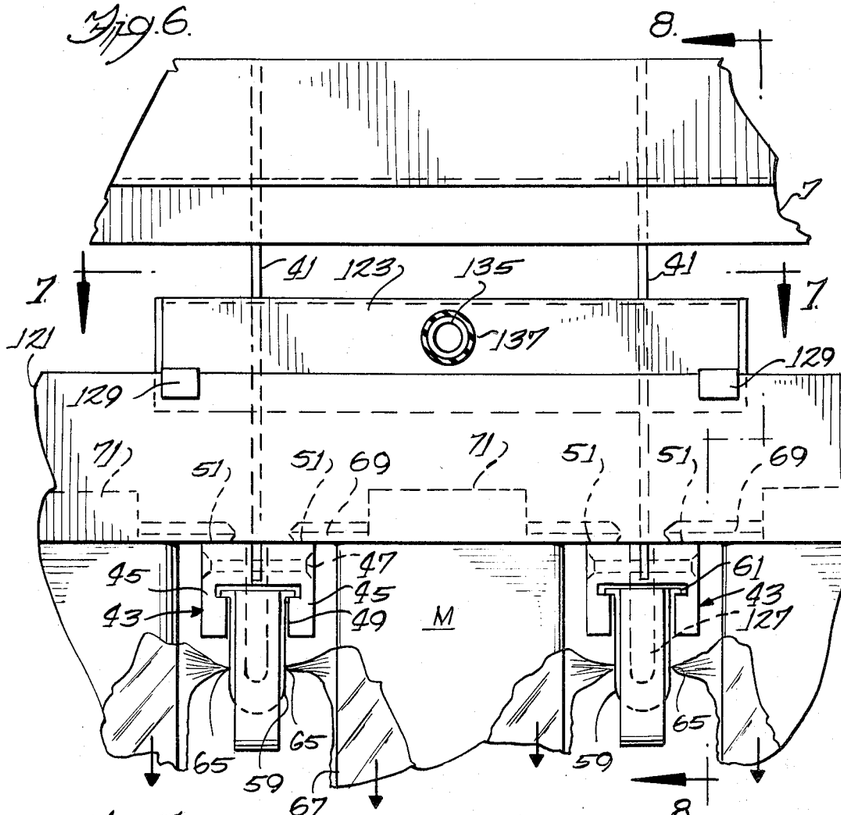
FIG. 6 is a fragmentary sectional view, on an enlarged scale, taken along line 6—6 of FIG. 5.
Figure 7:
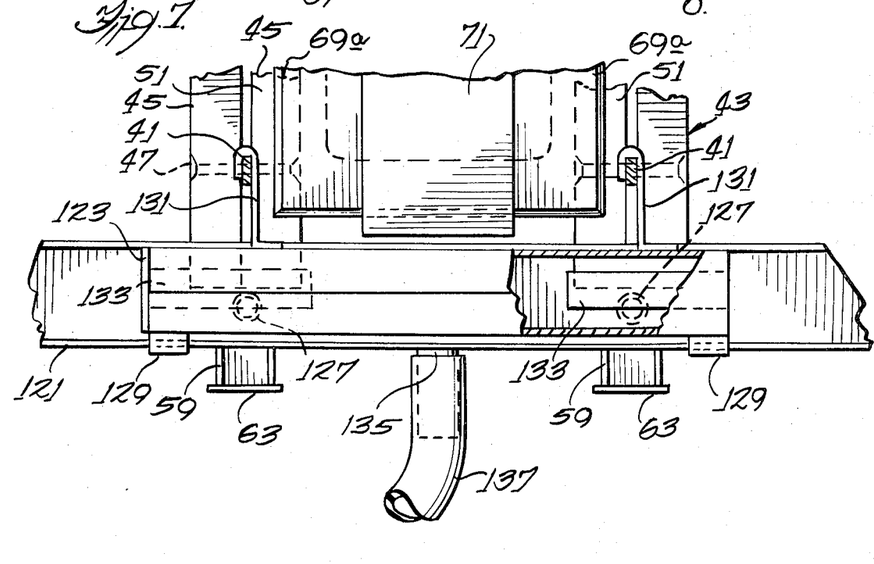
FIGS. 7 and 8 are fragmentary sectional views taken along lines 7—7 and 8—8 respectively of FIG. 6.

The mold M with which the presennt apparatus is preferably used is of a type having a tubular body 67 and an upper marginal flange 69 which projects laterally of the body 67. When in use, such a mold is customarily provided with a spring pressed cover 71 of a conventional design that has pivoted ratchet arms hooking under the upper marginal flange. However, as seen in FIGS. 4 and 6 the cover 71 is somewhat narrower than the mold body whereby the marginal flanges 69 on two opposed sides of the mold are not interfered with by the spring-pressed cover. In the present embodiment of the invention, these last two-mentioned portions (see 69a, 69a, FIG. 7) of the marginal flange 69 are adapted to seat on and be suspended at the bearing surfaces 51 of the slider bars 43. The molds herein shown are so-called "dual molds" in which a single cover with two spring pressed pressure plates are normally used. However, the apparatus of the present invention is suitable for use with single molds. It will be seen, therefore, that the slider bars 43 provide passageways to receive molds that are suspended by their marginal flanges 69 on the bearing surfaces 51 such that the holes 65 in the troughs 59 are presented to the sides of the mold bodies a short distance below the upper lateral flanges 69.

Welded or otherwise rigidly secured to the ends 3, 5 are clips 73 for removably receiving restraining bars 75, 75, there being one restraining bar 75 at each open side of the housing 2. The restraining bars 75 may be lifted upwardly for convenient removal from the clips 73. In loading molds into the housing 2, one of the restraining bars 75 is removed while the other restraining bar 75 is in place. The molds are thus loaded from the open side of the housing that is free of the restraining bar. The molds are easily loaded in place by positioning the marginal flanges 69 of the molds onto the bearing surfaces 51 of the slider bars 43 and then sliding the molds along the slider bars, the first inserted mold of each row being retained by the restraining bar 75. The mold bodies 67 of adjacent dual molds are prevented from touching each other by reason of engagement of the edges of the upper marginal flanges 69 of adjacent molds as well as by engagement of the lower marginal flanges 69a (FIGS. 1 and 5). In any event, it is not critical whether or not the marginal flanges of the adjacent molds touch or not. Unloading of the molds from the truck is likewise facilitated by the low friction of the bearing surface 51 since the molds can be readily slid along those bearing surfaces and outwardly of either open side of the housing.

Figure 14:
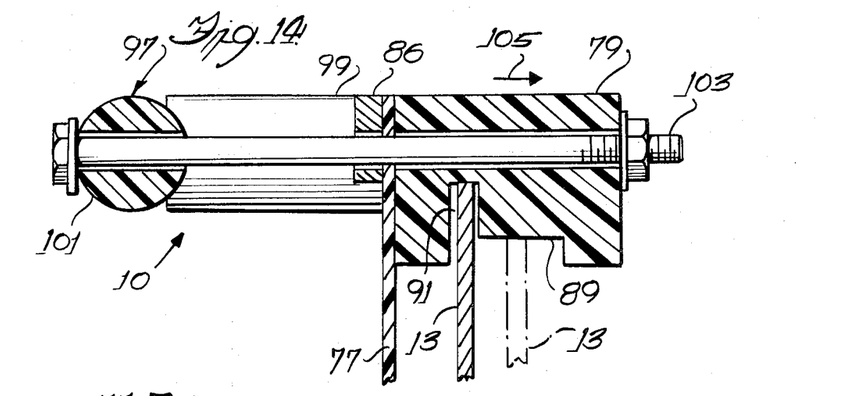
FIGS. 14, 15 and 16 are fragmentary sectional views, on an enlarged scale, taken along lines 14—14. 15—15 and 16—16 respectively of FIG. 13.
Figure 15:
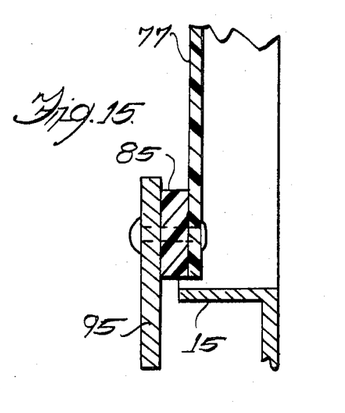
Figures 16, 18:
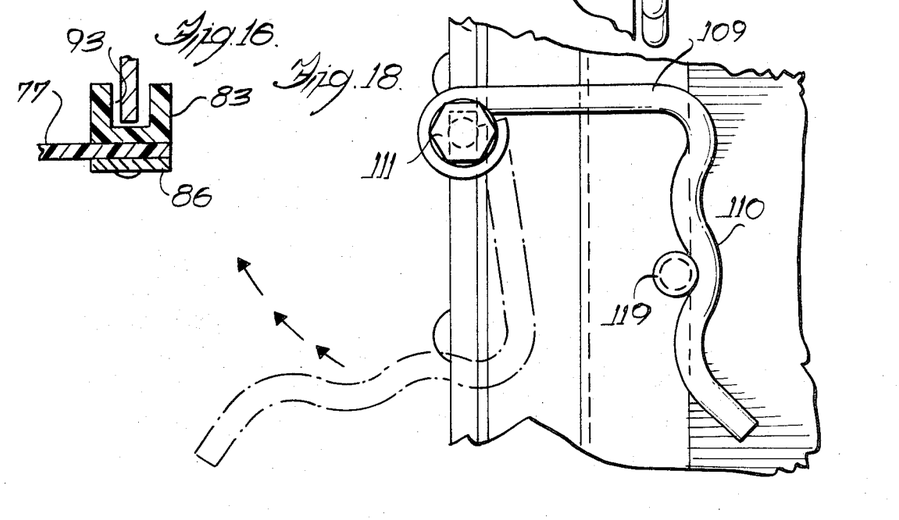
FIG. 18 is a fragmentary elevational view as seen from the right hand side of FIG. 17.

Turning now to FIGS. 13–18, each removable side closure 10 comprises a flexible panel or sheet 77 of heavy gauge rubberized fabric. This may, for example, be a suitable "Neoprene" belting of satisfactory thickness. The margins of the sheet 77 are provided with a top bar 79, side bars 81,83 and a bottom bar 85. These bars may be of high density polyethylene. Trim stripping 86 may also be provided on the outside of the sheet 77. The respective bars 79, 81, 83, 85 and trim stripping are secured to the sheet 77 by suitable screws 87. As best seen in FIG. 14, the top bar 79 has a downwardly presented shoulder 89 and adjacent thereto a groove 91. As shown in FIG. 16, the side bar 83 is formed with an inwardly opening groove 93. While not specifically illustrated, the side bar 81 is similar in cross section to the side bar 83 and thus has a groove similar to the groove 93. Centrally of the bottom bar 85 and secured thereto in any suitable manner is a depending, relatively short metal plate or clip 95.

The top bar 79 includes a handle structure 97 for manipulating the side closure 10. As best seen in FIG. 14, this handle structure 97 includes three spaced apart spacer bars 99 (one being shown in FIG. 14) and a handle rod 101 that is thus spaced from the sheet 77 but is secured in place through the spacer bars 99 by bolt and nut assemblies 103. The side closure 10 is easily handled by gripping the handle rod 101. Furthermore, the top, bottom, and side bars of the closure form a relatively rigid frame for the side closure which makes handling thereof easy even for inexperienced workmen. To rigidify further the frame formed by the marginal bars of the side closure 10, stiffener angles (not shown) may be provided at the corners of the side closure where the ends of the respective marginal bars are adjacent to each other.

After the molds M with the food product p therein have been loaded into the housing 2, the side closures 10 may be mounted in place preparatory to the steam cooking operation. In mounting the side closures, the handle rod 101 is gripped and the side closure lifted so as to position the shoulder 89 on the edge of the flange 13. The side closure 10 may then be moved longitudinally along the flange 13 until the side closure is properly aligned with respect to the open side of the housing 2. This aligned condition occurs when the grooves 93 on the side bars 81, 83 come into alignment with the flanges 11, 11 on the ends 3, 5. At this time the side closure 10 may be pushed toward the housing, as indicated by the arrow 105 (FIG. 14) whereby the flange 13 moves off of the shoulder 89 as shown in dotted lines in FIG. 14, and into the groove 91 as shown in full lines. At the same time the flanges 11, 11 will seat in the respective grooves 93, as shown in FIG. 16. The foregoing structure provides, in conjunction with a latching mechanism about to be described, a reasonably effective barrier that prevents excessive escape of steam that is supplied through the pipe 29 to the interior of the housing 2 during the cooking operation.

Figure 17:
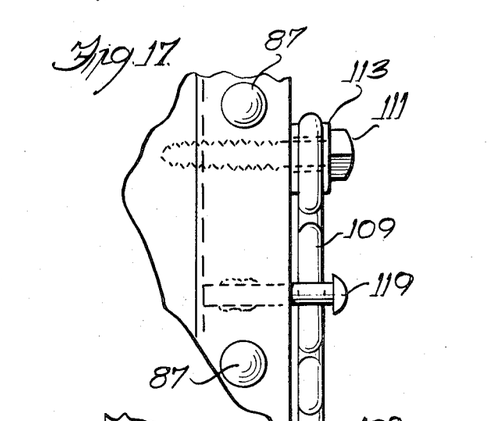
FIG. 17 is a fragmentary front elevational view of a portion of one of the side closures and showing the latching mechanism for retaining the side closure in place.

To secure the side closures 10 in place, each side closure has two spaced apart latch devices 107, one of which is shown in detail in FIGS. 17 and 18. The latch device 107 comprises a latch bar 109 that is pivotally secured to a lag screw 111 which constitutes a pivot support for the latch bar 109. A spacer or sleeve 113 is interposed between the latch bar 109 and the lag screw 111 to form the pivot bearing for the latch bar. The latch bar 109 is, furthermore, generally L-shaped with a reversely curved locking arm 110, as shown in FIG. 18 and is somewhat resilient so that it is under tension when it is in its locked position, as in full lines in FIG. 18. The housing ends 3, 5 have outwardly projecting latch pins 119 whereby rotation of the latch bar 109 from the broken line position, FIG. 18, to the full line position thereof causes the latch bar to clamp against the latch pin 119, drawing the side closure against the housing.

During the steam cooking operation a reduced pressure within the housing 2 due to steam condensation may tend to cause a differential of pressure to be applied on the outside of the side closures 10. To prevent a buckling or pulling in of the bottom portions of the side closures the plate or clip 95 is used. Thus, if pressure is applied to the outside of panel 77 the relatively rigid plate 95 engages the flange 15 to prevent buckling in of the bottom of the side closure.

Following the steam cooking operation the side closures 10 are removed preparatory to chilling the molds. For this purpose the apparatus of the present invention includes a water distributing trough 121 and a water chamber or manifold 123, both of which may be readily mounted in the housing following removal of the side closures 10. The water distributing trough 121 and the water manifold 123 may be mounted at either side of the housing to enhance the flexibility of operation of the apparatus. Moreover, it is not necessary that both side closures 10 be removed during the mold-chilling operation, as only one of the side closures need be removed to permit installation of the trough 121 and manifold 123.

Referring now more particularly to FIGS. 4–8, it will be seen that the water distribution trough 121 extends longitudinally of the housing 2 or, viewed another way, transversely of the parallel troughs 59. As best seen in FIG. 8, the trough 121 is supported by the upper or bearing surfaces 51 of the slider bars 43 but overhangs one end of the slider bar 43. The distributing trough 121, furthermore, is retained within the housing by stops 125, 125, seen in FIGS. 1, 9 and 10. These stops 125 are welded or otherwise secured to the housing ends 3, 5 and are, of course, at each open side of the housing for retaining the trough 121 irrespective of which side of the housing the trough 121 may be placed. Spaced along the length thereof and projecting from the bottom of the trough 121 are nozzles 127 which respectively project into the troughs 59, as best shown in FIG. 8. Mounted on the distributing trough 121 is the manifold 123 which, it will be noted, is substantially shorter than the trough 121. The manifold 123 telescopes within the upper end of the trough 121 and has U-shaped ears or clips 129 which receive the upper edge portions of one wall of the trough 121. The manifold 123 also has a pair of rearwardly projecting arms 131 that are hook-shaped at their ends for receiving two of the hanger bars 41. Thus, the manifold 123 may be mounted any place along the length of the distributing trough 121 at which the arms 131 will engage and be retained by two hanger bars 41. The bottom of the manifold 123 has a pair of openings 133 that are presented to the interior of the trough 121. The front wall of the manifold 123 has a nipple 135 for removably receiving a hose 137 or other supply pipe, which is connected to a source of coolant, such as water.

Water supplied through the hose 137 enters the water chamber or manifold 123 and is discharged through the openings 133 thereof and into the water distribution trough 121. From there the water is distributed through the nozzles 127 to each of the conduits or troughs 59. The water in the conduits 59 discharges through the holes 65 and impinges on the exterior surfaces of mold bodies 67. The water runs downwardly along the exterior surfaces of the mold bodies 67 by gravity and in doing so spreads out in a film that tends to wrap around the mold bodies insuring a maximum of heat transfer therefrom. The coolant that drains off of the molds drops downwardly into the pan 9 and may be discharged therefrom through one or more drain openings 139 (FIG. 4). Where water is used it may be simply discharged to the sewer. However, where chilled brine is used a recirculating pump may be employed to recycle the brine and ultimately deliver the childed brine back into the mainifold 123 through the hose 137. Because of the fact that the coolant issues from the troughs 59 below the upper ends of the molds, it is not material whether or not the coolant is clean since the arrangement prevents the coolant from coming into contact with the cooked product within the mold. Since the distribution trough 121 and manifold 123 are, in effect, simply slipped into place during use, they may be readily removed from the truck following the chilling operation. This places the truck in condition for unloading the molds and subsequent reloading with a fresh supply of molds to be steam processed.

The invention is claimed as follows:

1. Apparatus for cooking and chilling products in molds of the type having a tubular mold body open at its upper end and with cover means closing said upper end and a laterally outwardly projecting flange on said body at said upper end, the apparatus comprising a housing and means for supplying heat to said housing; and further having an improvement comprising spaced slider bars mounted in the upper portion said housing for suspending a series of molds at said flanges thereof, conduit means spaced from said mold bodies, said conduit means having a series of holes opening toward said mold bodies for discharging liquid coolant from said conduit means and onto the exterior surface of said mold bodies adjacent to but below said flanges, whereby the coolant discharged onto the mold bodies flows by gravity along the mold bodies in a spreading film to the bottoms thereof.

2. Apparatus according to claim 1 in which said spaced bars have anti-friction bearing surfaces whereby the molds may be loaded onto said bars and shifted therealong, and said conduit means are supported by said spaced bars.

3. Apparatus according to claim 1 further including distribution means for supplying coolant to said conduit means.

4. Apparatus according to claim 3 in which said distribution means comprises a trough having means for discharging coolant into said conduit means.

5. Apparatus according to claim 4 in which said trough is supported by said spaced bars and extends transversely thereof.

6 Apparatus for processing meat products in molds comprising a housing having opposed open sides spaced bars in said housing, conduit means supported by and depending from said spaced bars, said bars and conduit means defining passageways for receiving molds adapted to be suspended from said spaced bars, said conduit means having holes opening toward said molds for discharging coolant from the conduit means against said molds, and removable closures are provided for said open sides.

7. Apparatus according to claim 6 in which each side closure comprises a panel having a plate at its lower margin for engagement with an adjacent surface of the housing.

8. In a transportable apparatus for cooking and chilling products in molds of the type having a tubular mold body and a laterally outwardly projecting flange at the upper end of said body, said apparatus comprising a housing, means in said housing for supporting therein a group of said molds in their upstanding positions, means for supplying steam to said housing; an improvement comprising conduit means for supplying cooling liquid to the exterior surfaces of said molds, said conduit means having means for directing the cooling liquid onto the mold bodies below the respective flanges thereof whereby the coolant flows downwardly along the sides of the mold bodies in a spreading manner.

9. An apparatus for cooking and chilling products in molds, said apparatus having a housing, mold-supporting means in said housing, first conduit means in said housing for supplying coolant to chill the molds, second conduit means for supplying steam to heat the interior of said housing, said housing being open at opposite sides to permit loading and unloading of molds into said housing, a side closure for each side opening, and means for removably and independently securing each side closure to the housing over an open side.

10. In an apparatus according to claim 9 each side closure having a panel and marginal bars, said marginal bars having grooves that receive a marginal flange on said housing at an open side.

* * * * *